US011027792B2

(12) United States Patent
Wesling

(10) Patent No.: US 11,027,792 B2
(45) Date of Patent: Jun. 8, 2021

(54) BICYCLE CONTROL DEVICE AND SYSTEM

(71) Applicant: SRAM, LLC, Chicago, IL (US)

(72) Inventor: Kevin Wesling, Lombard, IL (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 16/445,868

(22) Filed: Jun. 19, 2019

(65) Prior Publication Data

US 2019/0300113 A1 Oct. 3, 2019

Related U.S. Application Data

(63) Continuation of application No. 15/788,374, filed on Oct. 19, 2017, now Pat. No. 10,370,061.

(60) Provisional application No. 62/411,188, filed on Oct. 21, 2016.

(51) Int. Cl.
| | |
|---|---|
| *B62M 9/122* | (2010.01) |
| *B62M 25/08* | (2006.01) |
| *B62M 9/123* | (2010.01) |
| *B62M 9/133* | (2010.01) |
| *B62M 9/12* | (2006.01) |
| *F16H 61/02* | (2006.01) |
| *B62J 45/40* | (2020.01) |

(52) U.S. Cl.
CPC ............ *B62M 9/122* (2013.01); *B62M 9/123* (2013.01); *B62M 9/133* (2013.01); *B62M 25/08* (2013.01); *B62J 45/40* (2020.02); *B62M 9/12* (2013.01); *F16H 61/0213* (2013.01)

(58) Field of Classification Search
None
See application file for complete search history.

(56) References Cited

U.S. PATENT DOCUMENTS

| | | | | |
|---|---|---|---|---|
| 5,266,065 | A * | 11/1993 | Ancarani Restelli | ........................ B62M 25/08 474/78 |
| 6,682,087 | B1 * | 1/2004 | Takeda | ................... B62K 23/00 280/238 |
| 7,350,787 | B2 * | 4/2008 | Voss | ........................ B60L 50/20 280/5.5 |
| 8,321,097 | B2 * | 11/2012 | Vasiliotis | ................. B62M 6/40 701/51 |
| 8,768,585 | B2 * | 7/2014 | Cheng | .................... B62M 9/123 701/55 |
| 9,249,880 | B2 * | 2/2016 | Vasiliotis | ................ F16H 61/66 |
| 9,487,268 | B2 * | 11/2016 | Fukao | ..................... F16H 59/38 |
| 9,815,522 | B2 * | 11/2017 | Tachibana | .............. B62M 25/08 |

(Continued)

FOREIGN PATENT DOCUMENTS

| | | |
|---|---|---|
| CN | 105984541 | 10/2016 |
| TW | 530016 | 5/2003 |

*Primary Examiner* — Dirk Wright

(57) ABSTRACT

A bicycle control system may be configured to automatically control a bicycle, or components thereof. The bicycle control system may include a system control device configured to provide a simplified shifting system wherein large changes in speed associated with starting and stopping do not require the full attention of the automatic shifting system. The shifting system, or a system control device configured for controlling the shifting system, may be configured to determine when to enter an automatic shifting control mode, establish parameters for the automatic shifting of the automatic shifting control mode, and/or compare detected activities and values of the bicycle to the established parameters.

15 Claims, 10 Drawing Sheets

(56) References Cited

U.S. PATENT DOCUMENTS

| | | | | |
|---|---|---|---|---|
| 9,975,603 B2* | 5/2018 | Bortolozzo | ............ | B62M 9/133 |
| 10,086,906 B2* | 10/2018 | Baumann | ................ | B62M 11/16 |
| 10,119,612 B2* | 11/2018 | Zhang | ...................... | G07C 5/08 |
| 10,370,061 B2* | 8/2019 | Wesling | ................. | B62M 9/122 |
| 10,507,885 B2* | 12/2019 | Chen | ........................ | B62M 6/50 |
| 10,780,945 B2* | 9/2020 | Gao | ......................... | B62M 6/45 |
| 2002/0094906 A1* | 7/2002 | Jordan | ................... | B62M 25/08 |
| | | | | 475/254 |
| 2014/0290412 A1* | 10/2014 | Emura | .................. | B62M 25/08 |
| | | | | 74/473.12 |

\* cited by examiner

BICYCLE CONTROL DEVICE AND SYSTEM

This application is a continuation of U.S. patent application Ser. No. 15/788,374, filed on Oct. 19, 2017, which claims priority to, and/or the benefit of, U.S. provisional patent application 62/411,188, filed on Oct. 21, 2016, the contents of which are incorporated herein in their entirety.

FIELD OF THE INVENTION

This invention generally relates to bicycle shifting control, and specifically relates to a simplified application of automatic shifting for a bicycle that may negate control issues related to stopping and starting the bicycle and changing between manual and automatic modes.

BACKGROUND OF THE INVENTION

Bicycle transmissions may have multiple gears, and/or gearing combinations, to provide different torque and/or power transmission options for the rider to operate the bicycle in different bicycle riding environments. For example, the transmission may provide different gearing options for going fast downhill, riding up steep hills, or riding through rough terrain. Existing bicycle control systems may be controlled through mechanical actuation or through electronic control. These gears and/or gearing combinations may be provided in the form of rear sprocket cassettes, one or more front chainring sprockets, internally geared hubs, frame mounted gear boxes, or any combination of these as well as other options. It is advantageous to have multiple gears from which a rider may choose to maintain the rider's preferred pedaling cadence (i.e. rate of rotation of the bicycle crank of the transmission). However, the more gears the bicycle has the more often the bike rider must shift from one gear or gear range to another. This is especially difficult when the bicycle makes large speed changes. For example, when the bicycle comes to a stop from full speed or the reverse, many speed changes are required.

Existing bicycle control systems have used electronic control in an attempt to be fully automatic. This requires the bicycle to automatically shift gears from a dead stop and throughout the entire range of gearings provided by the bike transmission. In such systems, bicycles with front and rear derailleurs are synchronized the shifting of both derailleurs to achieve a steady change in gears without large jumps between gearing combinations. A problem with traditional automatic transmission systems is these systems have not established what gear to actuate or maintain when the bicycle comes to a stop. This is made more difficult when stopping on hills or other inclinations in either direction. Also, all the shifting required when starting and stopping uses up battery power when the system is electrically controlled. Existing systems include static and/or pre-set control variables that do not offer the rider the ability to customize the variables, such as gearing shift triggers, associated with the automatic shifting. Also, existing systems do not offer the rider multiple options for how automatic shifting may be turned on and/or off. Further, existing systems are minimally adaptable and do not synchronize multiple wireless components and sensors to maintain automatic shifting over a less than full range of bike speeds.

SUMMARY

In an embodiment, a system control device is provided for a bicycle having a transmission with a plurality of gear options. The system control device includes at least one processor, and at least one memory including computer program code. The at least one memory and the computer program code are configured to, with the at least one processor, cause the apparatus at least to perform determining when at least one automatic mode entry condition is met, establishing at least one automatic mode parameter as a cadence parameter when the at least one automatic mode entry condition is met, comparing an active cadence of the bicycle to the at least one cadence parameter, adjusting, based on the comparison, a shifting device of the bicycle to change to a different gear of the plurality of gears, determining if at least one automatic mode modification condition is met, and modifying at least one automatic mode parameter based on the determination that at least one automatic mode modification condition is met.

In an embodiment a non-transitory computer readable medium is provided. The medium includes instructions that when executed on a computer are operable to determine when at least one automatic mode entry condition is met, establish at least one automatic mode parameter as a cadence parameter, compare an active cadence of the bicycle to the at least one cadence parameter, adjust, based on the comparison, a shifting device of the bicycle to change to a different gear of the plurality of gears, determine if at least one automatic mode modification condition is met, and modify at least one automatic mode parameter based on the determination that at least one automatic mode modification condition is met.

In an embodiment, a method of operating a bicycle is provided. The method involves determining, by a processor, when at least one automatic mode entry condition is met. The method also involves establishing, by the processor, at least one automatic mode parameter as a cadence parameter. The method also involves comparing, by the processor, an active cadence of the bicycle to the at least one cadence parameter. The method also involves adjusting, by the processor based on the comparison, a shifting device of the bicycle to change to a different gear of the plurality of gears. The method also involves determining, by the processor, if at least one automatic mode modification condition is met, and modifying, by the processor, at least one automatic mode parameter based on the determination that at least one automatic mode modification condition is met.

In an embodiment, the demining if at least one automatic mode modification is met comprises determining if a speed of the bicycle is below a low speed threshold, and the modifying at least one automatic mode parameter comprises disabling automatic mode when the speed is below the low speed threshold.

In an embodiment, the at least one automatic mode entry condition comprises at least two automatic entry mode conditions.

In an embodiment, establishing at least one automatic mode parameter comprises establishing the cadence parameter during bicycle operation using one of at least two different techniques.

In an embodiment, establishing at least one automatic mode parameter comprises establishing a cadence range including an upper cadence limit and a lower cadence limit.

In an embodiment, a different cadence range is established for at least two gear options of the plurality of gear options.

In an embodiment, the modifying at least one automatic mode parameter comprises pausing the automatic shifting mode.

In an embodiment, the modifying at least one automatic mode parameter comprises resuming automatic shifting mode.

In an embodiment, the resuming automatic shifting mode is performed based on a determination that a bicycle speed is above a speed threshold.

In an embodiment, the resuming automatic shifting mode is performed based on a determination that a cadence is above a cadence threshold.

In an embodiment, the resuming automatic shifting mode is performed based on a determination that a measured bicycle power has dropped below a power threshold.

In an embodiment, the pausing the automatic shifting mode is based on a determination that a button has been actuated.

In an embodiment, the button is configured to cause an adjustment of the shifting device to change to different gears when the automatic mode is inactive.

BRIEF DESCRIPTION OF DRAWINGS

Other aspects and advantages of the embodiments disclosed herein will become apparent upon consideration of the following detailed description, wherein similar or identical structures have similar reference numerals.

DETAILED DESCRIPTION

Figure 1:
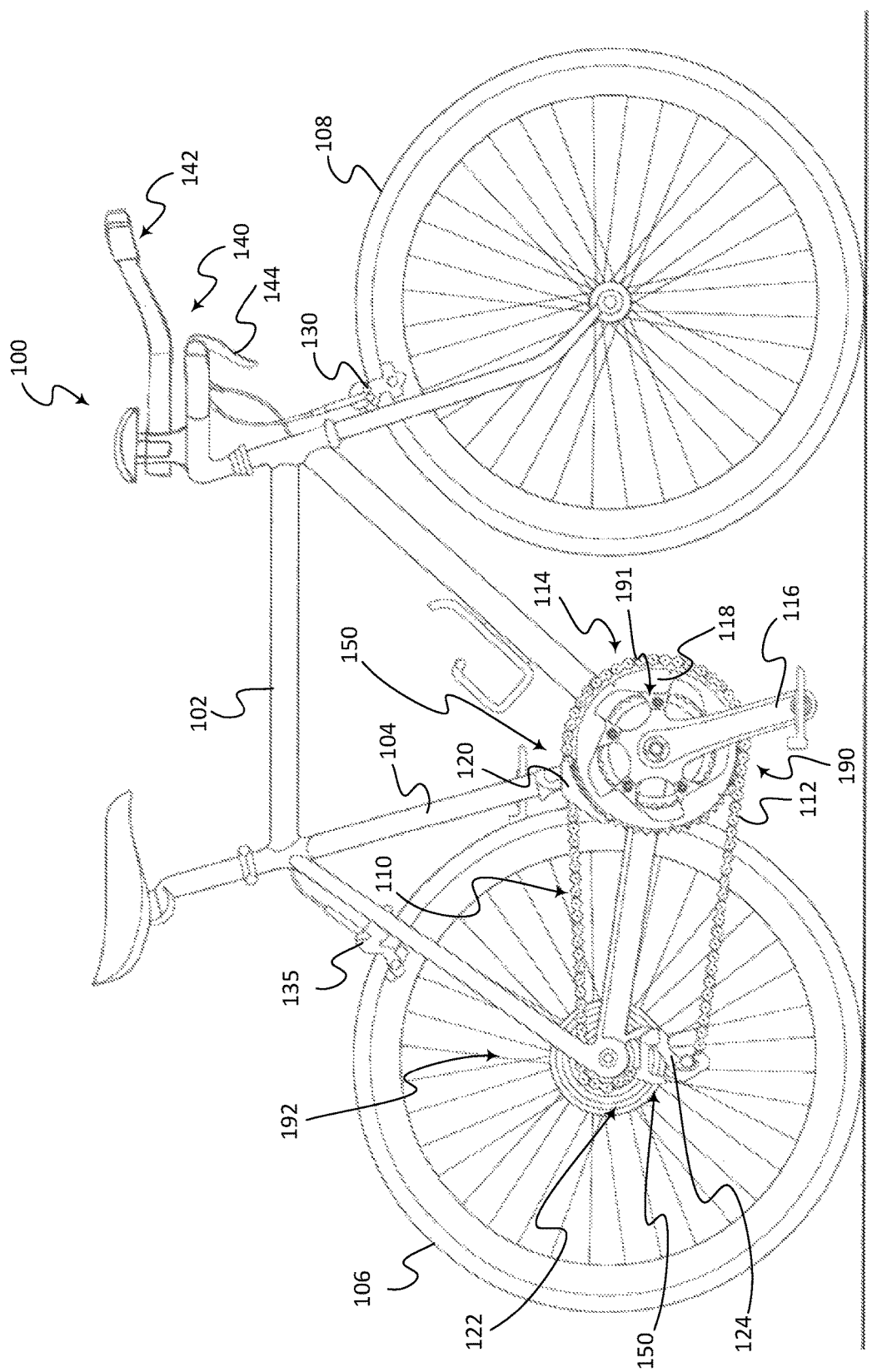
FIG. 1 is a right side elevational view of a bicycle according to one embodiment.

A bicycle control system may be configured to automatically control a bicycle, or components thereof. The bicycle control system may include a system control device configured to provide a simplified shifting system wherein large changes in speed associated with starting and stopping do not require the full attention of the automatic shifting system. The shifting system, or a system control device configured for controlling the shifting system, may be configured to determine when to enter an automatic shifting control mode, establish parameters for the automatic shifting of the automatic shifting control mode, and/or compare detected activities and values of the bicycle to the established parameters. Different automatic shifting mode entry, exit, and parameter modification techniques may be used. The techniques may be related to characteristics indicative of an instant and/or current operation of the bicycle. For example, detected bicycle speeds and/or cadence values may be characteristics indicative of an instant and/or current operation of the bicycle. For example, automatic shifting, or other modules, may be simplified by limiting the application to only work when the bicycle is at higher speeds.

In an embodiment a bicycle control system may multiple ways to turn the control system, or components thereof, on and off while riding.

In an embodiment, a bicycle control system provides multiple techniques to set the cadence of the bicycle during operation of the bicycle.

In an embodiment, a bicycle control system may provide a method to automatically turn the system, or components of the system, off while riding, including an indication from the system that the system is about to, is currently, or has already turned on or off the system, or components of the system.

In an embodiment, multiple methods and/or mechanisms are provided to establish the cadence both during use of the bicycle, and when the bicycle is not in use. Also, in an embodiment the ability to set the cadence range is provided. Further, in an embodiment, the cadence and/or the cadence range may be set for each gear and/or gearing combination of a bicycle transmission.

In an embodiment shifting between gears and/or gearing combinations may be delayed during multiple shifts to avoid double shifting. This time delay may be adjusted by the user.

In an embodiment, the bicycle control system may allow a rider to distinguish between bicycle transmission states, such as a coasting state and one or more low cadence states of the bicycle.

In an embodiment a rider may choose to override the automatic gear selection component of a control system for a period of time and then revert to the back to automatic gear selection component automatically, or through selection by the rider. For example, a rider may override the auto system by manually shifting, with the control system reverting back to automatic shifting control when a measured average transmission power drops below a user defined set point.

A system control device may be configured so as to be integrated, or coupled, with a bicycle to control bicycle components. The system control device may interface with electromechanically controlled bicycle components so as to trigger an action, such as shifting or changing between front and rear gear combinations when actuated. The system control device may include instructions configured to cause the electromechanically controlled bicycle components to shift between gearing combinations automatically (i.e. without specific input or prompting from a rider of the bicycle) based on rider established, or otherwise determined, thresholds, values, parameters, and/or readings from one or more sensors of the bicycle configured to detect characteristics of the bicycle.

Various embodiments of the invention will be described herein with reference to the drawing. It will be understood that the drawing and the description set out herein are provided for illustration only and do not limit the invention as defined by the claims appended hereto and any and all their equivalents. For example, the terms "first" and "second", "front" and "rear", "left" and "right" are used for the sake of clarity and not as terms of limitation. Moreover, the terms referred to bicycle mechanisms conventionally mounted to a bicycle and with the bicycle orientated and used in a standard fashion unless otherwise indicated.

It is to be understood that the specific arrangement and illustrated components of the frame 22, front wheel 24, rear wheel 26, drivetrain 28, front brake 30, rear brake 32, and saddle 34 are non-limiting to the disclosed embodiments. For example, while the front brake 30 and the rear brake 32 are illustrated as hydraulic rim brakes, hydraulic disc brakes are contemplated and encompassed within the scope of the disclosure. Additionally, mechanical systems including mechanical rim brakes and mechanical disk brakes, as well as other electronic, hydraulic, pneumatic, and mechanical systems, or combinations thereof, such as suspension systems, are contemplated and encompassed within the scope of the present disclosure.

As used herein "cruise control" refers to an automatic shifting mode of a system control device for a bicycle gear shifting system.

FIG. 1 generally illustrates a bicycle 100 with which one or more system control devices 150 may be used to implement a bicycle control system using the methods described herein. The bicycle 100 includes a frame 102, front and rear wheels 108, 106 rotatably attached to the frame 102, and a drivetrain 110. A front brake 130 is provided for braking the front wheel 108 and a rear brake 135 is provided for braking the rear wheel 106. The drivetrain 110 includes a chain 112, a front crank assembly 114 including a crank 116, one or more chainrings 118, a front derailleur 120 may be attached to a seat tube 104 or other portion of the frame 102, a rear sprocket assembly 122 coaxially mounted to the rear wheel 106 and a rear derailleur 124. In the displayed embodiment, the drivetrain 110 involves electro-mechanical operation of the front derailleur 120 and/or the rear derailleur 124. In an embodiment, the drivetrain may involve only a single front chainring 118, and as such may not include the front derailleur 120.

A handlebar assembly 140 is attached to the frame 102 for user, or rider, control of the bicycle 100. The handlebar assembly may include a manual shift control device 142. One or more manual shift control devices 142 (e.g. buttons) may be used with the bicycle. The manual shift control devices are configured to actuate or otherwise control components of the bicycle 100. For example, the manual shift control device may be configured to control gear shifting of the front derailleur 120 and/or the rear derailleur 124. The manual control devices may also be configured to control characteristics of a suspension system (not shown). The handlebar assembly 140 may also include a brake lever 144 that is configured to operate the front brake 130. The rear brake 135 is operated by a brake lever (not shown) also located on the handlebar assembly 140.

The bicycle 100 may also include one or more cadence sensors 190, and/or power meters 191. The cadence sensor may be integrated into the power meter, measured directly from the crank, and/or determined from the known gear, wheel size, speed of the bike during pedaling, or other techniques. The power meter may be crank based, chainring spider based, hub based or any type of power meter operational to provide an indication of the power input and/or output of the bicycle. A speed sensor 192 may also be included. The speed sensor may be a wheel speed sensor, a global positioning system device, or any other type.

The manual shift control devices 142 are part of a bicycle control system, or control system, that includes a system control device 150 configured for causing the rear and/or front derailleur to shift between gearing combinations of the bicycle using manual control as described above, or through automatic control based on user defined values and/or bicycle sensor readings of bicycle characteristics. As shown in FIG. 1, the system control device 150 is integrated into the rear derailleur. The system control device 150, however, may be integrated with other components, such as the manual control device(s) 142, as a standalone device, or combinations thereof using parallel and/or joint processing techniques. For example, the system control device 142 may be integrated with, or configured to control, one or more internal gear hubs of a drivetrain of a bicycle.

While the illustrated bicycle 100 is a road bike, the present invention has applications to bicycles of any type, including fully or partially suspensioned mountain bikes and others, as well as bicycles with mechanical (e.g. cable, hydraulic, pneumatic) and non-mechanical (e.g. wired, wireless) drive systems. For example, the illustrated handlebar assembly 140 involves an aero-bar configuration, however, the shift control device and/or bicycle control system may be used with other types of handlebar assemblies as well, such as drop bars, bullhorn bars, riser bars, or any other type of bicycle handlebar. For example the shift control device may be integrated with brake lever device to form an integrated shift brake device configured for attachment to drop-style handlebars. Also, while the embodiments described herein describe manual control devices attached to handlebars, a person having experience in the art would recognize the possible positioning of control devices at other areas of a bicycle, such as locations throughout the frame 102 or other locations.

Figure 2:
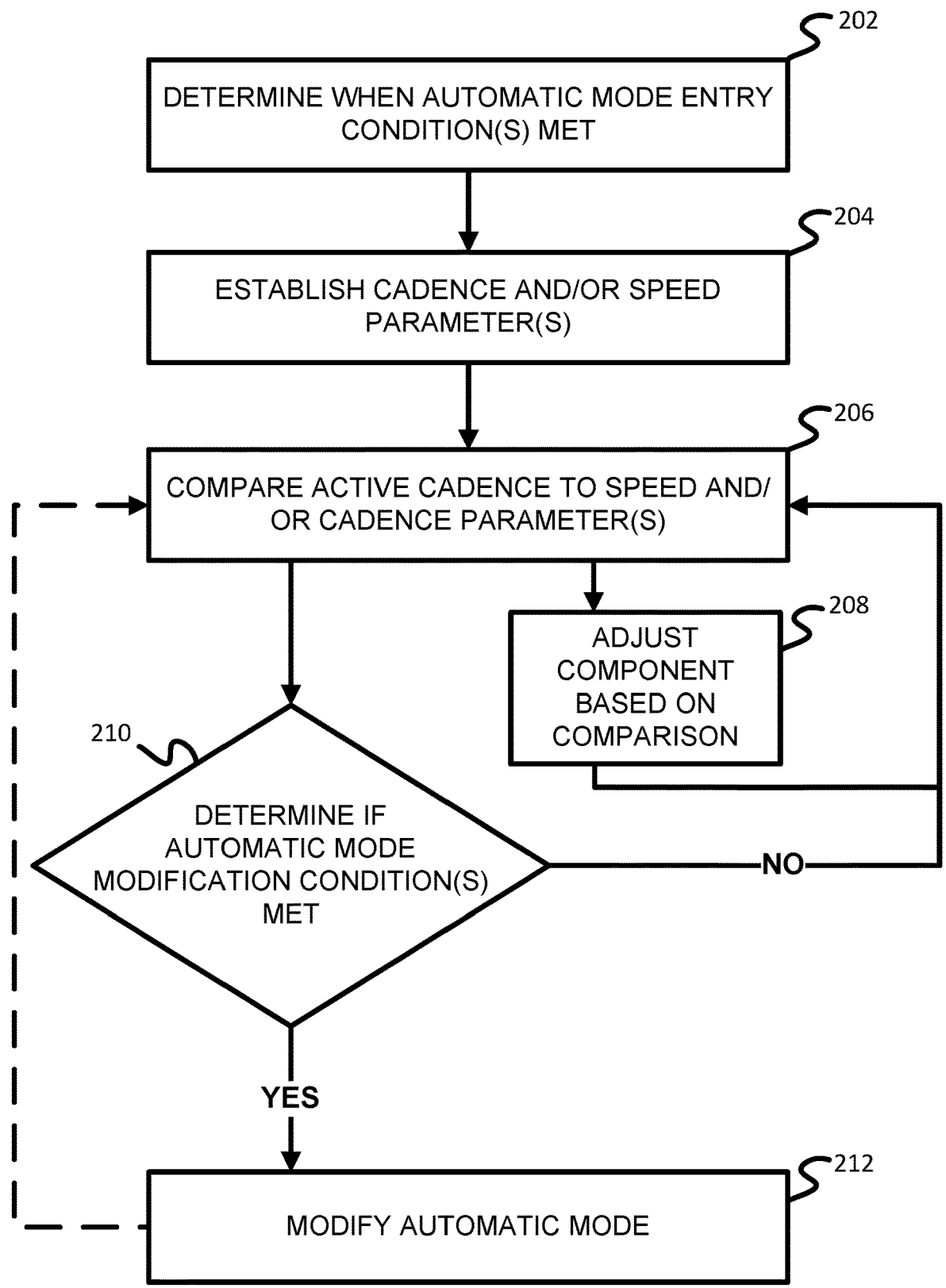
FIG. 2 illustrates a flow chart of an embodiment of a method of controlling a bicycle.

FIG. 2 illustrates a flow chart of an example embodiment for a method of controlling a bicycle, particularly as it relates to an automatic, or automatic shifting, mode of a bicycle and/or bicycle component(s). FIGS. 3-8 illustrate flow chart of examples of embodiments for methods, modes, and/or functions for controlling automatic shifting modes on a bicycle. As presented in the following sections, the acts may be performed using any combination of the components indicated in FIGS. 9 and 10. For example the following acts may be performed by a processor 60 as integrated with a system control device 150 which may be integrated with one or more bicycle components 30A and/or 30B. Additional, different, or fewer acts may be provided. The acts are performed in the order shown or other orders. The acts may also be repeated and/or performed at multiple times throughout the method. For example, determining if automatic mode modification condition(s) have been met (Act 210) may be performed for multiple modification conditions and/or at different sequenced positions of a method.

An automatic shifting system may be configured, such as with appropriate sensors or other devices, to monitor and/or detect system parameters to be used for system control. For example, the automatic shifting system may use one or more of cadence, power, and/or speed measurement to control shifting of the transmission. Some initial parameters that may need to be established include:

Cadence, or the rotation of the cranks as measured in revolutions per minute ("RPM");

Default Cadence, or a set preferred cadence established by the rider. The default cadence may be established by the rider during or prior to riding;

Cadence Band, or a set range of cadences where the system will stay within the same gear. The cadence band may include a cadence upper and/or lower limit;

Cadence Lower Limit, or a speed at which the automatic system takes an action or modifies a parameter, such as temporarily suspending operation. The cadence lower limit may be preset or adjusted by the user with a separate interface. The cadence lower limit exists to establish a threshold between a very low cadence that requires a downshift and simple coasting. This limit may be in the range of 2 RPM-20 RPM. It may be preset or adjusted by the user with a separate interface;

Speed Lower Limit, or the bicycle speed at which the automatic transmission system either starts, stops, or temporarily suspends (i.e. pauses) operation. It may be preset or adjusted by the user with a separate interface. The speed lower limit may include a singular threshold value, or may include multiple values for various actions. For example, the speed lower limit may be split into a turn on value and a turn off value and the speed at which the system turns on may be different than the speed at which the system turns off or suspends; and/or Power Limit, or the user preset power value that is compared with the power outputted by the rider and measured by the power meter. It may be advantageous to limit shifting above this power to protect the system from damage. It may also be advantageous to increase either the positive or negative variance of the cadence band during periods of peak power. This increase in cadence will maintain the same power but lower the chain tension thereby reducing the forces in the chain during the shift.

The parameters are used, either independently or in combination, by the system control device to control the automatic shifting system of the bicycle, for example as is indicated in the flow charts provided in FIGS. 2-8.

In Act 202 the system control device determines if one or more automatic mode entry conditions are met. The automatic mode entry conditions may be any criteria operable to indicate an intent to enter an automatic mode of a component of the bicycle. In an embodiment, one or more buttons may be enacted (e.g. depressed or actuated) for a period of time. The buttons may be multiple purpose buttons, such as electronic shifting devices, configured as levers, plunger type buttons, rocker type buttons, or any other electronic actuation device. For example, the buttons may be typically used to indicate that a component, such as one or more bicycle derailleurs, is to shift a chain of the bicycle to a different gear, but when actuated in combination for at least three ("3") seconds, the system control device causes the component to enter into automatic mode. Other multi-purpose button based initiation techniques may also be used. For example, multiple system control buttons may be provided, such as manual shift control devices for electronic derailleurs.

Detected alternate actuation patterns and/or techniques may initiate the alternate function of the buttons. Different depression combinations and/or lengths of time may indicate the alternate function of the buttons. In an embodiment, when the system control device determines that a particular button of a plurality of buttons is actuated for an extended period of time (e.g. five seconds), the system control device causes the component to enter into automatic mode. In another embodiment, when the system control device determines that any button of a plurality of buttons is actuated for an extended period of time (e.g. five seconds), the system control device causes the component to enter into automatic mode. In yet another embodiment, when the system control device determines that a combination of buttons of a plurality of buttons is actuated for an extended period of time (e.g. five seconds), the system control device causes the component to enter into automatic mode. The combination of buttons may be a pre-determined combination of specific buttons, or any combination of multiple buttons.

In an embodiment, individual buttons of the multi-purpose buttons may have three or more actuating effects. In an embodiment, at least two distinct buttons are provided for controlling a front and rear derailleur of a bicycle. A first button actuated independently causes a rear derailleur to change the bicycle chain to a larger sized sprocket. A second button actuated independently causes the rear derailleur to change the bicycle chain to a smaller sized sprocket. The first and the second button actuated together for a first length of time causes the front derailleur to change to a different front gear. The first and the second button actuated together for a second length of time causes the system control device to enter into an automatic shifting mode. The first length of time may be shorter than the second length of time. For example, the first length of time may be less than one second, whereas the second length of time may be three seconds. In an embodiment, the buttons may provide a button release signal when the button is released by a user, and the absence of a button release signal within a period of time may trigger entry into an automatic shifting mode of the system control device.

In another embodiment, a bicycle speed may be monitored by the system control device using a speed determination device, such as a wheel speed sensor. When the system control device determines that the bicycle speed, such as is indicated by a wheel speed in this example, is above a minimum value the system control device causes the component to enter into automatic mode.

In Act 204 cadence and/or speed parameters are established. The cadence and/or speed parameters may be established using any technique. The speed and/or cadence parameters are used by the system control device to determine when an automatic adjustment, such as a shift using a derailleur, is to be enacted. In an embodiment, one or more cadence parameters are determined by the system control device using a cadence sensor. The system control device measures a cadence of the bicycle for a period of time, and establishes a value derived from the measured cadence over that time as the cadence parameter. The derived value may be any value characteristic of the cadence over the period of time. For example, the derived value may be an average, mode, or mean value for the cadence over the period of time. Also, the period of time may be an established or referenced period of time. In an embodiment, the period of time is equal to a period of time a button is actuated. For example, if two buttons are actuated for three seconds to cause the system control device to enter into an automatic mode, the system control device records values using the cadence sensor, during the time that both buttons are actuated to gather data for deriving the cadence value to establish.

In an embodiment, the system control device gathers cadence data over a period of time and determines multiple values, such as a mean and a standard deviation of the cadence over that time. This mean and standard deviation value may be used to establish an operations range for the automatic mode. For example, high and low cadence limits may be established from the values to determine characteristics of automatic shifting mode shifts. The high and low cadence limits may also be determined using other techniques. For example, an average cadence may be determined over a period of time, and a high cadence limit established as a pre-set cadence value higher than the average cadence, and the low cadence limit established as a preset cadence value lower than the average cadence. The preset values may be the same or different for the setting of the high and low cadence limits.

In another embodiment, at least one or more predetermined cadence parameter is saved in a memory of the system control device, and these one or more predetermined cadence parameters are established as the cadence and/or speed parameters. For example, a set of high and low cadence limits may have been manually input into the memory, or may have been stored in the memory during activity (i.e. a prior bicycle ride) of the system control device.

In Act 206 active cadence and/or speed parameters are compared to cadence and/or speed parameters established in Act 204. The comparison may be accomplished using any technique operable to qualify an active cadence and/or speed of the bicycle against the established cadence and/or speed parameters. In an embodiment, a current measured speed and/or cadence value is compared to high and low limits established for this value in Act 204. For example, a high cadence limit and a low cadence limit may be established, and an trailing time average of cadence values recorded for a period of time, for example the last one second, may be compared against the high cadence limit and the low cadence limit. This comparison may be repeated periodically or conducted continuously by the system control device during automatic mode operation.

In Act 208 a component is adjusted based on the comparison performed in Act 206. In an embodiment, the system control device causes the front and/or rear derailleur to change a gear of the bicycle based on the comparison. For example, the system control device shifts to an easier gear when a detected cadence reaches and/or goes below a low cadence limit and/or the system control device shifts to a harder gear when the detected cadence reaches and/or goes above a high cadence limit.

In Act 210 the system control device determines if one or more automatic mode modification conditions are met. Automatic mode modification conditions are conditions that when met trigger an altering or change of an operating parameter of the automatic mode. In an embodiment, the automatic mode modification conditions are conditions that when met subsequent to the establishment of cadence and/or speed parameters in Act 204 trigger an altering or change of the operating parameter of the automatic mode. In an embodiment, multiple automatic mode modification conditions are used to alter or change the operating parameters of the automatic mode. Further, detecting and/or determining the multiple modification conditions (Act 210), and subsequent modification of automatic mode (Act 212) as described further below, may occur at different positions of the indicated sequence. For example, the determining and/or modifying may occur after the establishment of the cadence and/or speed parameters (Act 204), but before the comparing of the active cadence and/or speed (Act 206).

Different actions and/or measured values may be an automatic mode modification condition. In an embodiment, operating a manual control that is not necessary for automatic mode may be an automatic mode modification. For example, a button depression, such as a depression of a shifting multi-use button described above, can be an automatic mode modification condition. This modification condition is useful as while the system control device is operating in automatic mode (e.g. causing at least one bicycle shifting component to shift gears based on cadence and/or speed parameters), there is no need to manually depress a shifting button to indicate a shift. A manual shift button depression during the automatic mode operation may be interpreted as indicating intent to change a parameter of the automatic mode, such as the system control device disengaging or pausing automatic mode.

Other actions and/or measured values may be automatic mode modification conditions. In an embodiment, a speed and/or cadence value may be an automatic mode modification condition. For example, a speed sensor, such as a wheel speed sensor, may be used to provide a bicycle speed to the system control device, and if the speed value indicated by the wheel speed sensor drops below a minimum threshold (i.e. the bicycle is traveling slowly), this measured value or detected action may be an automatic mode modification condition.

In an embodiment, a cadence value is an automatic mode modification condition. For example, a cadence sensor, such as a crank or crank arm sensor, may be used to provide a bicycle cadence to the system control device, and if the cadence value indicated by the cadence sensor drops below a minimum threshold (i.e. the rider is pedaling slowly), this measured value or detected action may be an automatic mode modification condition.

In Act 212 the control device modifies the automatic mode of the component based on the determination performed in Act 210. The modification may be to any operational parameter of the automatic mode. For example, the modification may be to upper and/or lower cadence and/or speed limits, an engaged/disengaged status of the automatic mode, combinations thereof or other operational parameters. In an embodiment, a modification condition involving a depression of a shift button during automatic mode operation can cause the system control device to pause or end the automatic mode operation. In an embodiment, a modification condition involving the simultaneous depression two buttons (e.g. an upshift and a downshift button) during automatic mode operation can cause the system control device to pause or end the automatic mode operation.

In an embodiment, a modification condition involving a slow speed during automatic mode operation can cause the system control device to pause or end the automatic mode operation. In an embodiment, a modification condition involving a slow cadence during automatic mode operation can cause the system control device to pause or end the automatic mode operation.

In an embodiment, a modification condition involving a shift button depression during automatic mode operation can cause the system control device to change the upper and/or lower cadence limits. For example, a depression of a downshift button during automatic mode operation can cause the system control device to change the lower cadence limits, such as by decreasing the limit by a value (e.g. five revolutions per minute) for each distinct depression of the down shift button. An upshift button may similarly control the upper cadence limit by incrementing the limit by a value for each distinct depression.

The particular parameter modified may be with the particular modification condition met, particularly when multiple modification conditions are implemented. In an embodiment, depressing a single shift button during automatic mode operation can cause the system control device to pause the automatic mode operation, whereas depressing two shift buttons simultaneously during automatic mode operation can cause the system control device to exit the automatic mode operation. In an embodiment, depressing a single shift button during automatic mode operation can cause the system control device to adjust a high and/or low cadence limit, whereas determining that the bicycle speed has slowed below a low speed threshold can cause the system control device to pause the automatic mode operation.

In an embodiment, any parameter described herein may be modified based on the determination and/or detection of any particular modification condition described herein. Further, in an embodiment, a particular parameter may be modified based on the determination and/or detection of multiple distinct modification conditions. For example, depressing a single shift button during automatic mode operation can cause the system control device to pause the automatic mode operation, whereas determining that the bicycle speed has slowed below a low speed threshold can cause also the system control device to pause the automatic mode operation.

In an embodiment, subsequent to, or concurrent with, modifying an automatic mode parameter (e.g. modifying a lower and/or upper cadence limit) (Act 212) the system control device continues to operate in the automatic mode with the modified parameters.

Further description of the provided functions, automatic mode parameters, modification conditions, and other embodiments of the control system are described below. These functions, automatic mode parameters, and modification conditions may be implemented in an embodiment in any combination or as specifically described herein.

Turning on Automatic Shifting

In an embodiment, the automatic transmission component of the control system may be turned on, or made operational, using multiple methods or techniques. These methods may include holding two separate buttons of the control system for a period of time. These may be single buttons on both the right and left hand manual shifters or two buttons on either the left or right manual shifter. The methods may also include holding any single button down for a length of time. The button may be one of the manual shift buttons or some other discrete button not associated with any other function or bicycle component. Another method may include recognizing that the bicycle has reached the bicycle speed lower limit, and after the bicycle speed lower limit is reached, the automatic function is turned on, or made otherwise operational. This threshold speed may be set or otherwise established by the rider. The speed lower limit may also be used to prevent the user from turning on the automatic mode unless a specific speed is first reached.

Turning off Automatic Shifting

In an embodiment, the automatic transmission component of the control system may be turned off, or made not operational, using multiple methods or techniques. These methods may include holding two separate buttons for a period of time, similar to the turning on option described above. The methods may also include actuating any shift button, initiating a shift and exiting automatic. The methods may also include reducing wheel speed below the speed lower limit. This could also include a defined period of time so that very short term periods below the lower speed limit do not turn off the system. The speed lower limit may be fixed, set by the rider or some function of the speed at which the rider initiated automatic mode. For example the speed lower limit may be established in the control system to be five ("5") miles per hour lower that the speed at which the automatic mode was initiated.

Suspend Automatic Shifting

In an embodiment, if the rider cadence falls below the cadence lower limit it may be assumed the rider is coasting and no automatic shifting is initiated. Once pedaling resumes automatic shifting is initiated to resume the set cadence. The cadence lower limit may also be a function of time. In this way, if the rider goes from the set cadence to a very low or zero cadence in a short period of time, coasting is assumed.

In an embodiment, the rider cadence changes very rapidly and the power limit is exceeded automatic shifting may be temporarily halted. The high cadence variance will be extended to allow for a short term increase in cadence. In this way a rider can quickly accelerate with a high cadence.

In an embodiment, if the rider upshifts manually to a harder gear (i.e. a gear that requires more power and/or torque to turn the crank arm), but exceeds the power limit, shifting may be halted while the power is high and resumed when the measured power drops below the power limit. In this way the rider may shift to a harder gear, stand and push hard to accelerate at a lower cadence but with high power and once the cadence increases back to the cadence set point, automatic shifting will resume.

Setting Cadence

In an embodiment, a cadence may be factory set, and then adjusted by the rider with a computer, smartphone other input device operational to communicate with the system control device. Also, the cadence may be preset prior to operation of the automatic mode. Cadence may also be set for each individual gear. In this way the lower gears may trend toward a higher cadence and the higher gears may trend toward a lower cadence. Also, cadence may be set at one value when the transmission is in a small front chainring and a different value when the transmission is in a big chainring. For example a rider may prefer a cadence of 80 RPM in the small chainring, but upon a self-initiated front shift to the big chainring, the set point may decrease to 70 RPM. In an embodiment, cadence may be set at the time of initiating automatic mode. For example the rider may a button, or combination of buttons such as the up and down shift buttons, concurrently for a length of time and the last received cadence value becomes the cadence set point.

Adjusting Cadence

In an embodiment, while in automatic mode the rider may actuate either the shift up button to increase cadence or the shift down button to decrease the cadence. The change in cadence with each button push may be one ("1") or more RPM and may be set by the rider. For example, each button push may provide for a two ("2") or ("5") RPM increment. A rider may initiate an override shift by pressing either the up or downshift button. This will result in a shift and an instantaneous change in cadence. The system records this instantaneous change in cadence and sets this as the new cadence. It may also be necessary to add or subtract from this instantaneous cadence measurement by a fixed amount to define the new cadence set point as a function of the instantaneous cadence rather than the actual instantaneous cadence.

Setting Cadence Band

In an embodiment, for any set cadence there will be a range of no shifting. This should be modifiable one or more band variables. For example if the rider sets the default cadence at 60 RPM, the rider may stay in the same gear until they reach 65 RPM at which time the system would shift into a harder gear to bring the cadence back down toward 60 RPM. Or likewise, if the cadence decreases to 56 RPM, the system would down shift to an easier gear to bring the cadence back to 60 RPM. This cadence band has a value of nine ("9") with a positive variance of five ("5") and negative variance of four ("4"). In an embodiment having multiple band variables, the band variables may be equal and set with the same variable, or they may be independently set by the rider.

Modes of Automatic Shifting of the Automatic Transmission

In an embodiment, the automatic transmission may have a full range automatic mode. In the full range automatic mode the system may be fully automatic, taking into account the redundant gears that occur when an 11 speed rear cassette is used with a 2-3 speed front. In this way the system will go from the lowest gear ratio (largest rear gear+smallest front gear) and stepwise increase to the largest gear ratio (smallest rear gear+largest front gear). At some point it will become necessary to shift from the small front chainring to the large front chainring. This front gear shift is usually 2-3 times larger than a rear shift in terms of percent gear change. For this reason, after a front shift is executed, it may be necessary to execute a rear shift in the opposite direction to reduce the amount of total gear change associated with the automatic gear change.

In an embodiment the automatic transmission may have a half range automatic mode. In a half range automatic mode the system may only initiate automatic shifts with the rear derailleur. If the automatic shifting is initiated while the chain is in the big front chainring, only the range associated with the rear cassette and big chainring will be automatic. If the rider reaches a hill and wants to down shift with the front chainring, they have to manually shift the front. Once the front has been manually changed to the small ring, the system will automatically change the rear gear per the earlier cadence set point.

In an embodiment the automatic transmission may have a partial range automatic mode. In the partial range automatic mode the rider may only want automatic shifting to function at very high gears and high speeds. In this case the rider chooses a set of gears within the rear cassette that are allowed to be automatic. Thus, maybe only gears associated with the 11, 12, 13, 14 and 15 tooth sprockets of the cassette may be shifted automatically. Once in the 15 tooth sprocket, to get to a lower gear (e.g. a 16 tooth sprocket) the rider would manually shift down. And likewise upon manually shifting back into the 15 tooth sprocket during acceleration, the system may be programmed to resume automatic shifting without additional input from the rider.

In an embodiment the automatic transmission may have a power dependent automatic mode. In the power dependent automatic mode the high or low cadence limit is reached but the rider input power is measured and found to exceed the power limit, the implicated automatic shift may be suspended until the measured rider power decreases. It may be necessary to average this power over time or rotations to avoid spikes in power that could be associated with the sinusoidal input from the rider. Additionally, instead of just suspending the automatic shifting at high power, it may be better to temporarily increase the set cadence to allow the rider to accelerate in the smaller gear with a larger cadence and then resume the set cadence in the larger gear once the gear has been changed.

FIGS. 3-8 illustrate flow charts for specific embodiments of the automatic shift systems and/or system modes with various combinations of the parameters and/or conditions described above.

Figure 3:
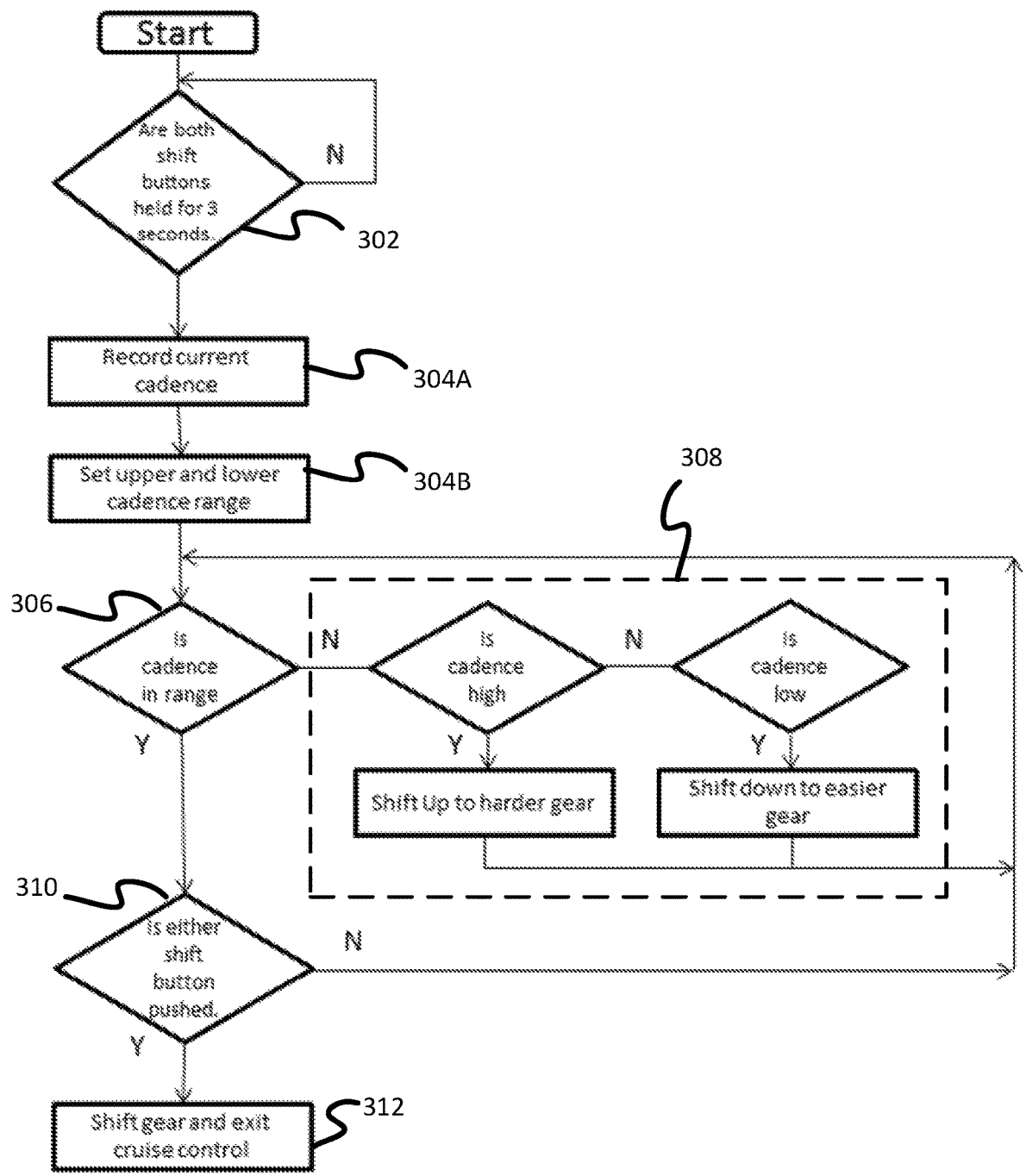
FIGS. 3-8 illustrate flow charts for example embodiments of a method of controlling a bicycle.

In the embodiment shown in FIG. 3 an instantaneous cadence is set, or established, upon starting or initiating automatic mode. In the embodiment, automatic shifting starts with pushing or otherwise actuating the up and down shift buttons for a period of time, such as three ("3") seconds (Act 302). This time is variable and can be anything longer than a normal shift time. The system control device records the cadence of the rider during the 3 seconds (Act 304A). The system control device sets the upper and lower cadence band/range (Act 304B). The cadence is periodically measured, compared with the cadence range (Act 306), and shifted as necessary (Act 308). If either shift button is manually pushed or otherwise actuated (Act 310), the automatic mode is exited (Act 312).

Figure 4:
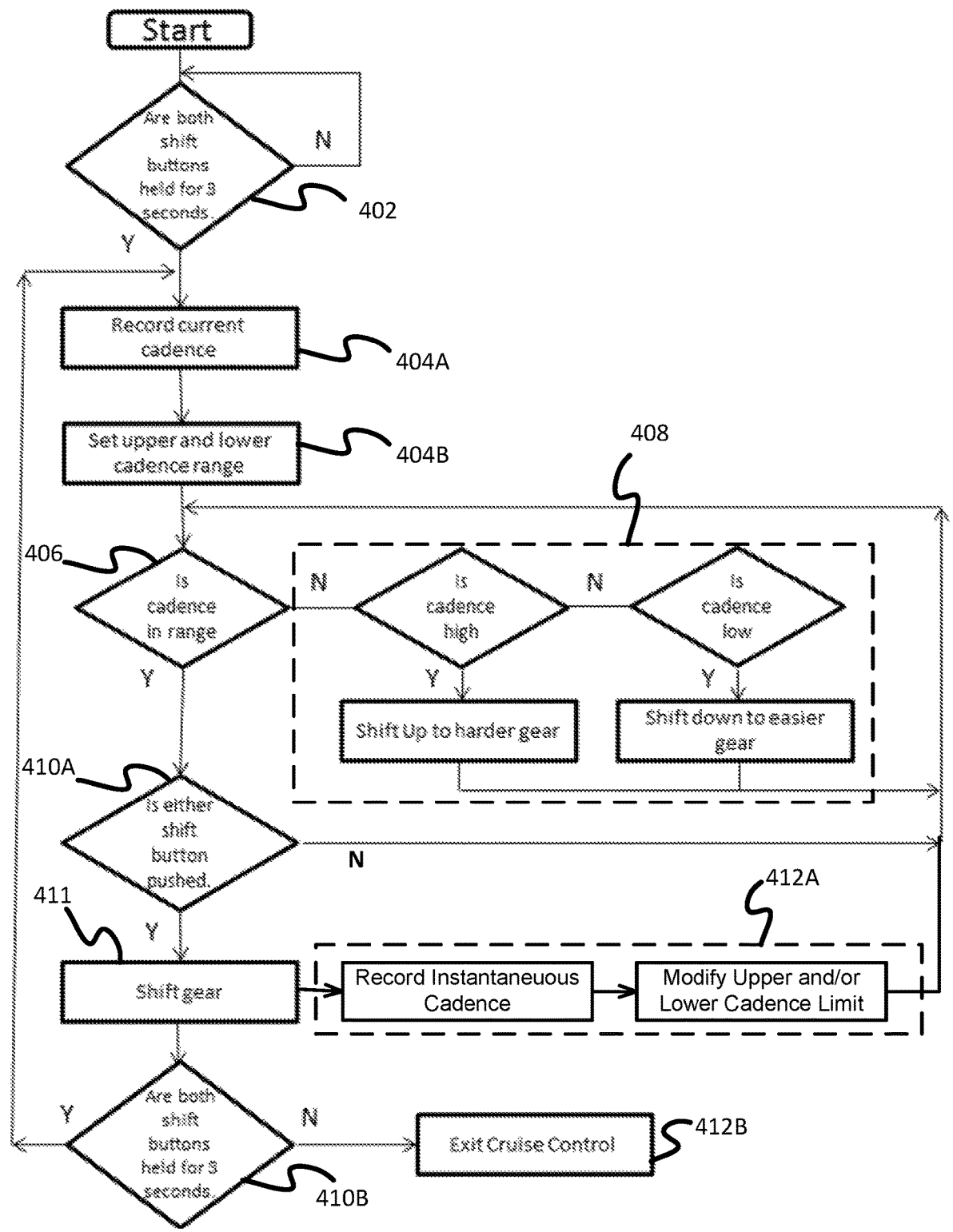

In the embodiment shown in FIG. 4, an instantaneous cadence is set upon a manual shift operation. In the embodiment, automatic mode, (i.e. automatic shifting) starts with pushing or otherwise actuating up and down shift buttons for a period of time (Act 402), for example ("3") seconds. The system control device records the cadence of the rider during the 3 seconds (Act 404A). The system control device sets the upper and lower cadence band/range (Act 404B). The cadence is periodically measured, compared with the cadence range (Act 406) and shifted as necessary (Act 408). If any shift button is manually pushed or otherwise manually actuated by the rider during automatic mode operation (Act 410A), the gear changes as requested (Act 411). After the shift the new cadence is immediately measured by the control system and recorded as the new set cadence (Act 412A. If both shifters are held or otherwise actuated for 3 seconds (Act 410B), the system exits automatic shifting mode (Act 412B). This time is variable and can be set to be greater than an established front shift time value.

Figure 5:
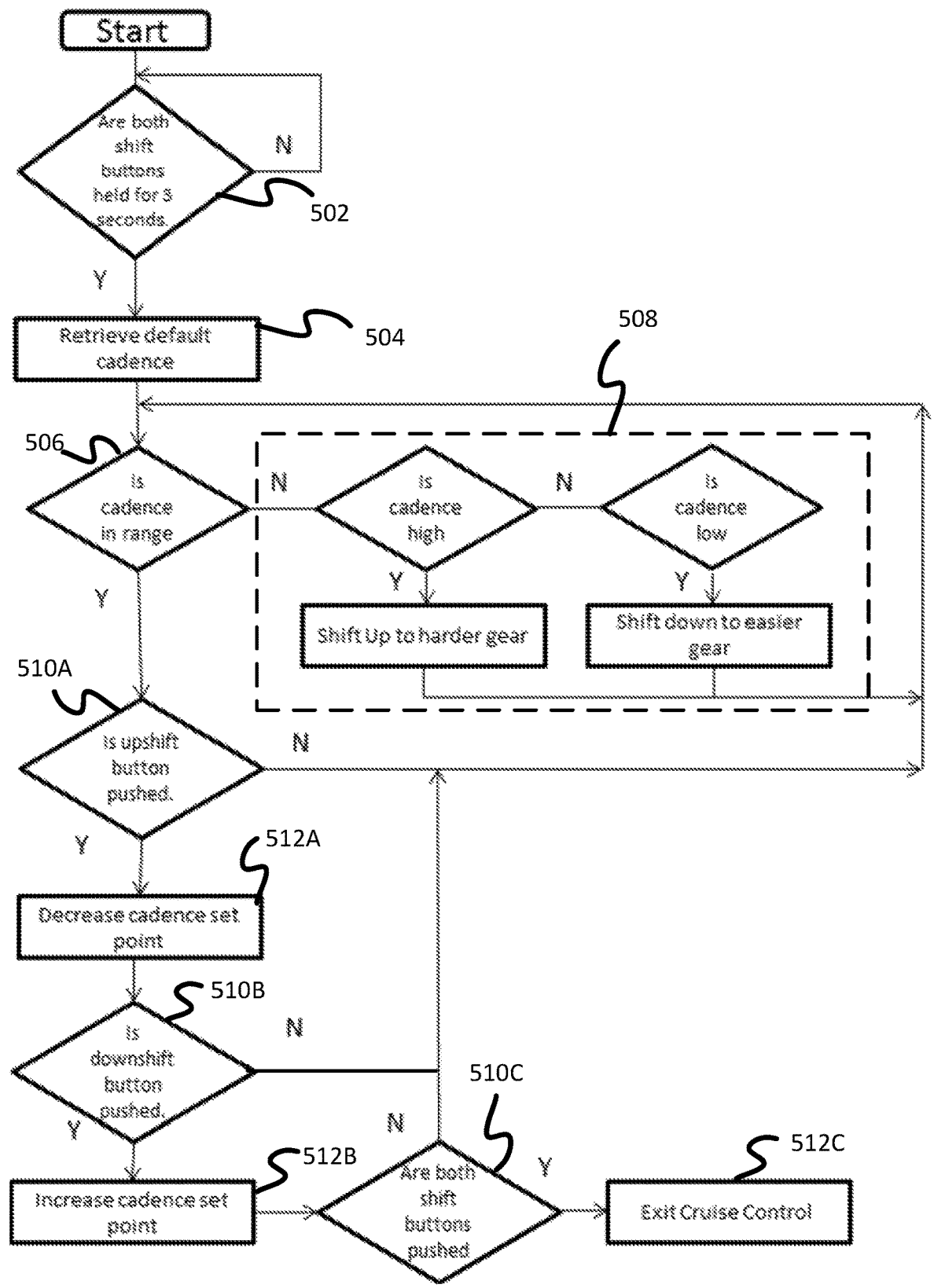

In the embodiment shown in FIG. 5, shift buttons adjust and/or modify cadence limits. In the embodiment, automatic shifting starts with pushing or otherwise actuating the up and down shift buttons for a period of time (Act 502), for example three ("3") seconds. The system control device retrieves the cadence from a memory (Act 504), for example as set earlier by the user. The system control device sets the upper and lower cadence band/range (Act 504). The cadence is periodically measured, compared with the cadence range (Act 506) and shifted as necessary (Act 508). If either shift button is manually pushed or otherwise manually actuated (Act 510A; Act 510B), the value of the set cadence is increased (Act 512A) or decreased (Act 512B) by a fixed amount, after which the new set point is compared with the current cadence (Act 506) to determine if a gear change is necessary. If both shifters are pushed or otherwise manually actuated (Act 510C), the system exits or otherwise deactivates the automatic shifting mode (Act 512C).

Figure 6:
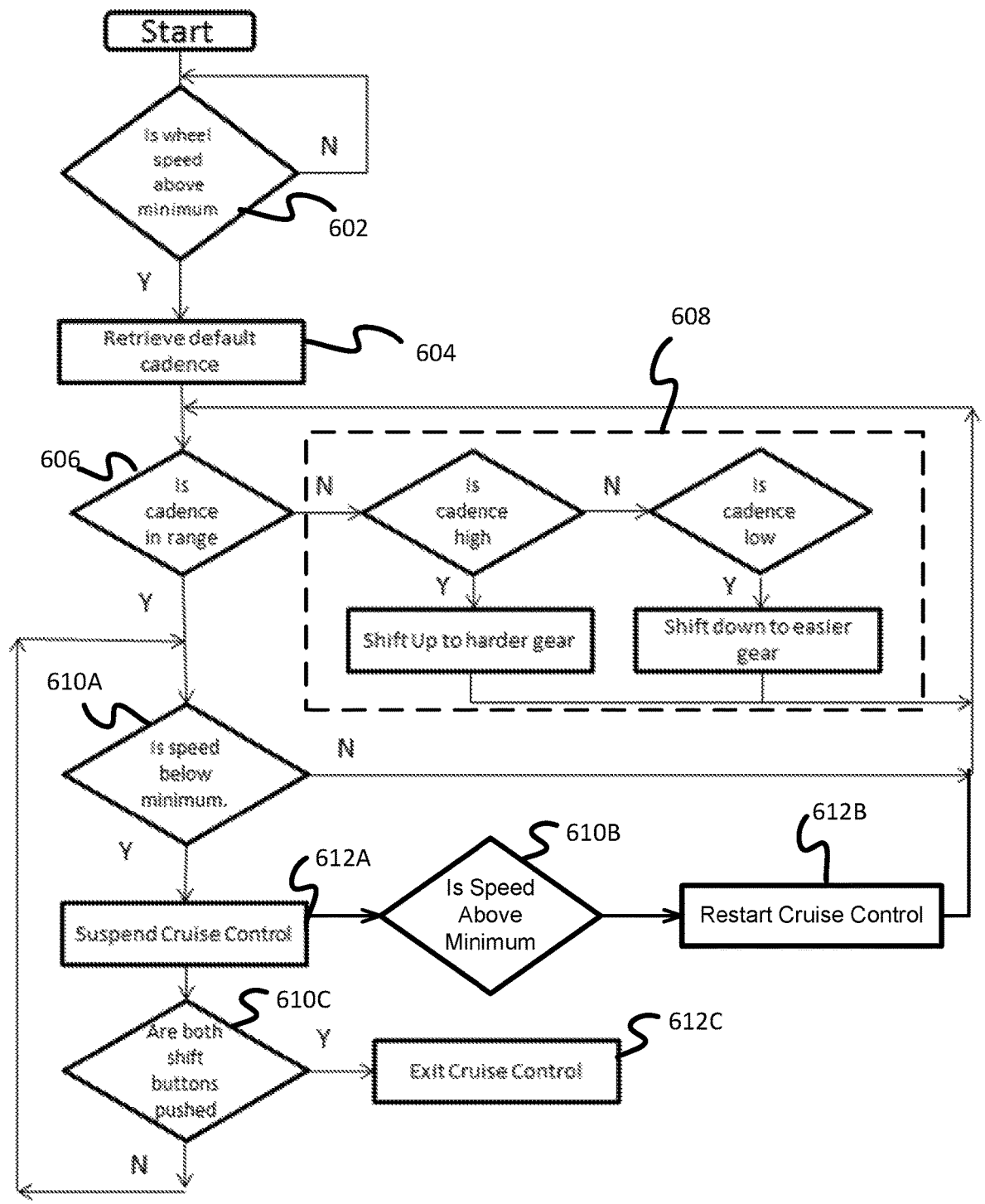

In the embodiment shown in FIG. 6, low bicycle speeds halt or pause cruise control, and higher speeds restart cruise control. In the embodiment, automatic shifting (i.e. the commencement of automatic mode) starts when the bicycle exceeds a set minimum speed (Act 602). The system control device retrieves the cadence set earlier by the user (Act 604). The system control device may set the upper and lower cadence band/range for the automatic mode. The cadence is periodically measured, compared with the cadence range (Act 606) and shifted as necessary (Act 608). If the bike speed decreases below the minimum speed (Act 610A), automatic mode is suspended or paused (Act 612A). If the bicycle speed increases above the minimum speed (Act 610B), automatic shifting mode is resumed (Act 612B). If both shifters are pushed or otherwise actuated by the rider (Act 610C), the system exits or otherwise terminates automatic shifting mode (612C).

Figure 7:
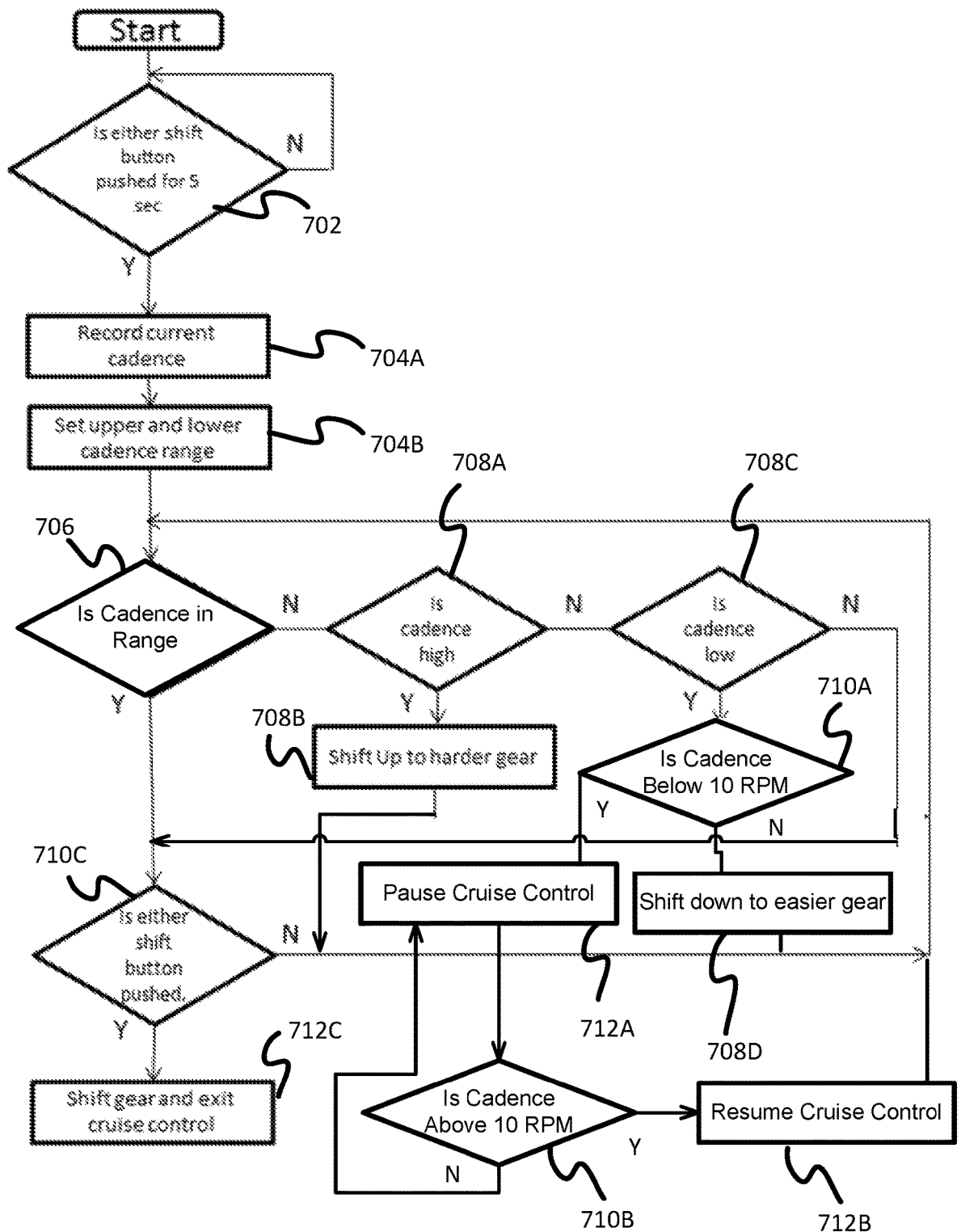

In the embodiment shown in FIG. 7, a determined very low bicycle cadence pauses automatic mode. In the embodiment, automatic shifting starts with pushing or otherwise actuating the up and down shift buttons for a period of time (Act 702), for example five ("5") seconds. The system control device records the cadence of the rider during the 5 seconds (Act 704A). The system control device sets the upper and lower cadence band/range (Act 704B). The cadence is periodically measured, compared with the cadence range (Act 706) and shifted as necessary (Act 708A-D). If the cadence falls below a low limit (Act 710A), automatic shifting mode is suspended or paused (Act 712A). If it is determined that the cadence increases above a low limit (Act 710B), automatic shifting mode is resumed (Act 712C). If either shift button is manually pushed or otherwise manually actuated (Act 710C), the automatic shifting mode is exited or otherwise deactivated (Act 712C).

Figure 8:
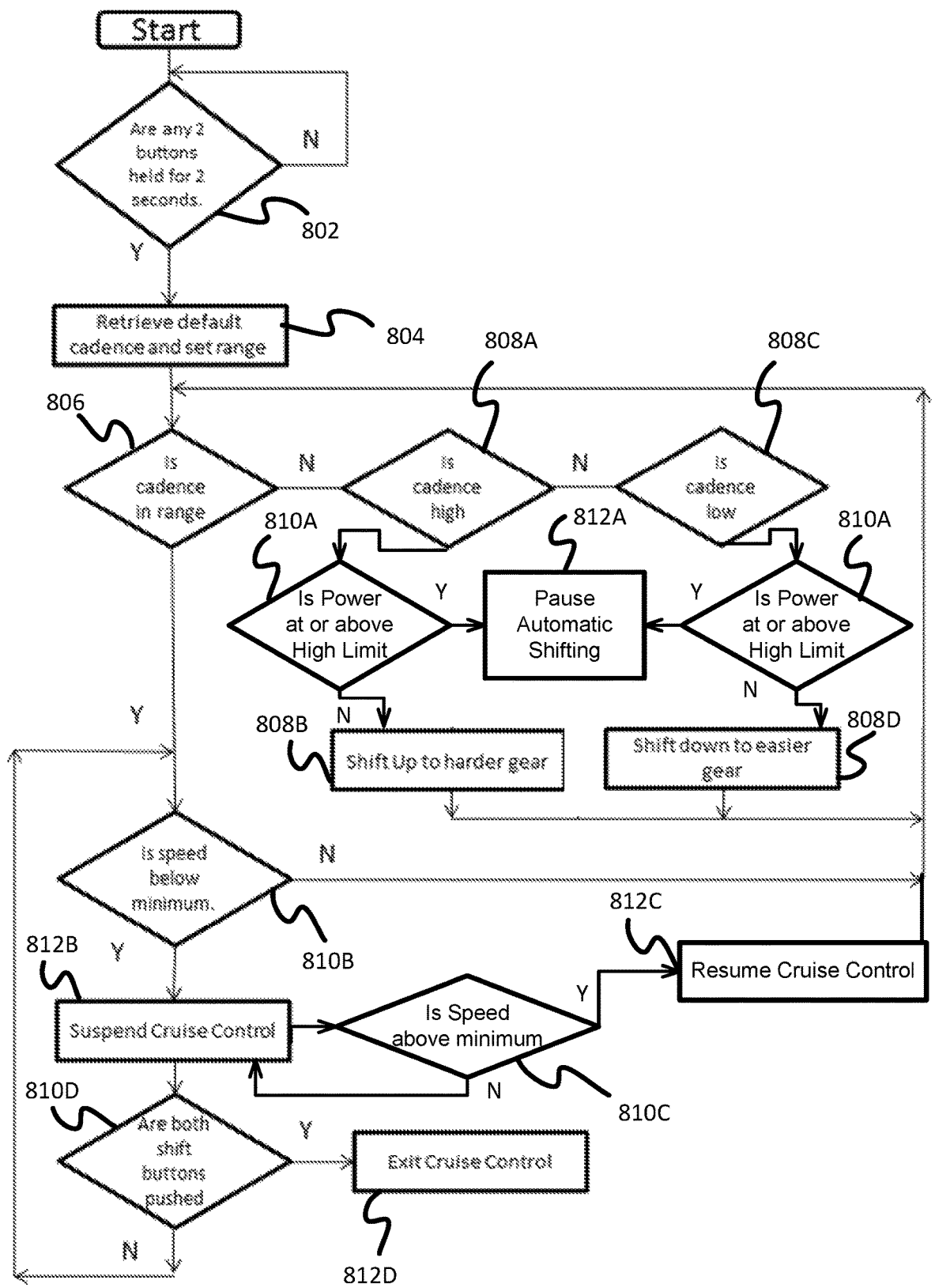

In the embodiment shown in FIG. 8, a determination of a high power input situation, such as with a bicycle power meter, prevents gear shifting. In the embodiment, automatic shifting starts when any two buttons are held or otherwise actuated for a period of time (Act 802), for example two ("2") seconds. The system control device retrieves the cadence set earlier by the user and sets cadence range (Act 804). The system control device is periodically measured, compared with the cadence range (Act 806). If the cadence is out of range (Act 808A, Act 808C) but below the power limit (Act 810A), a gear change, or shift, is executed (Act 808B, Act 808D). If the cadence is out of range and the power limit is exceeded (Act 810A), a no shift occurs (Act 812A). If the system control device determines that the bike speed decreases below the minimum speed (Act 810B), automatic shifting mode is suspended or paused (Act 812B). If it is detected that the bike speed increases above the minimum speed (Act 810C), automatic shifting mode is resumed (Act 812C). If both shifters are pushed (Act 810D), the system exits automatic shifting mode (812D).

Figure 9:
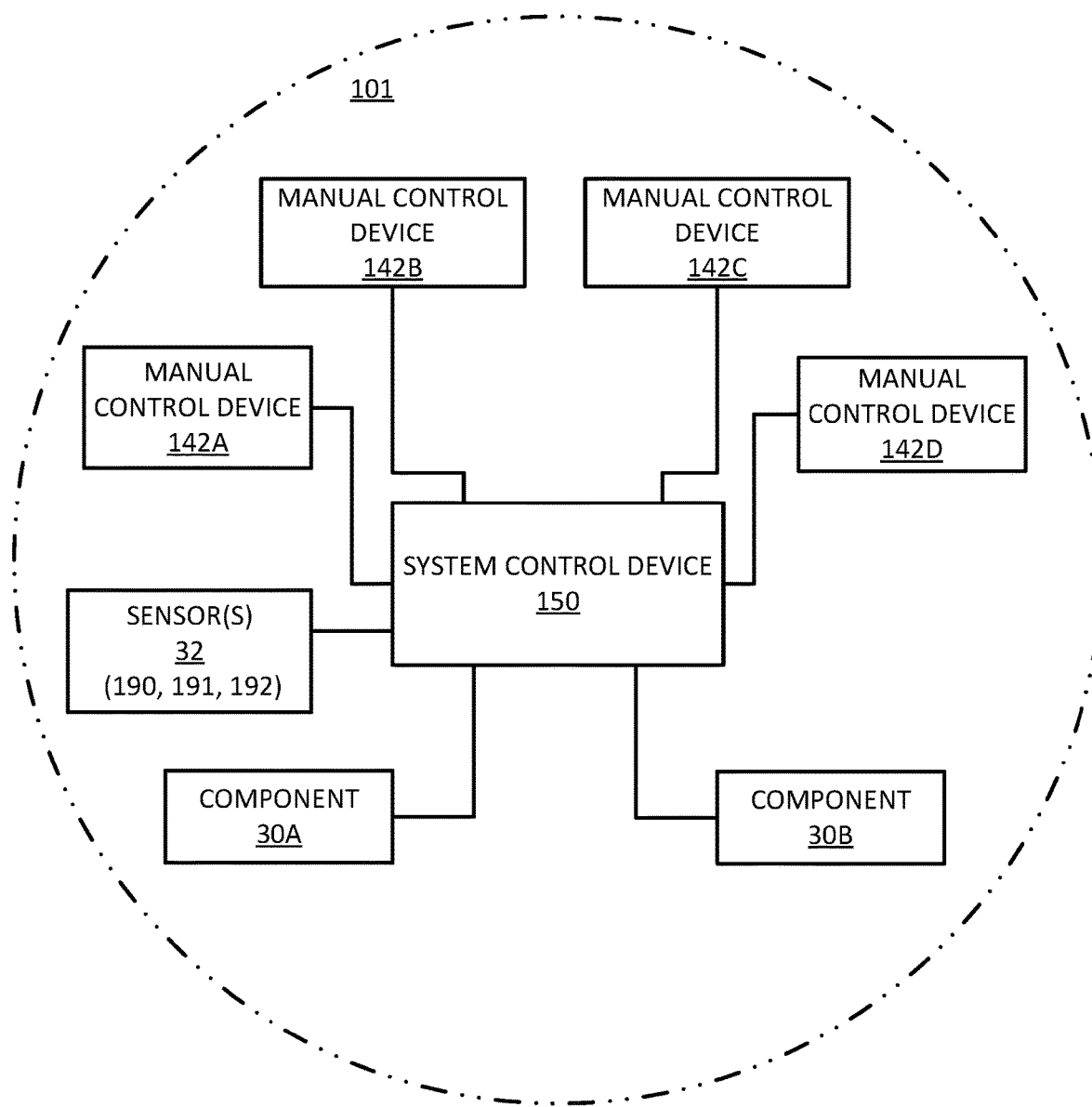
FIG. 9 is a block diagram of an exemplary bicycle control system for implementing methods of controlling a bicycle.

FIG. 9 illustrates a bicycle control system 101 that includes multiple manual control devices 142A-D, a system control device 150, at least one sensor 32, such as the power meter 190, cadence sensor 191, and/or speed sensor 192 described with respect to FIG. 1, and bicycle components 30A-B, such as a rear and/or front derailleur or one or more internal gear hubs. The manual control devices 142A-D are communicatively coupled with the system control device 150, such as by a cable or wirelessly, to communicate control signals to the system control device(s) 142. The system control device 150 is configured to communicate control signals responsive to the received control device signals, or resulting from automatic shifting determinations, to the component(s) 30A-B. In an embodiment, the system control device 150 is configured to communicate the control signals wirelessly to one or multiple bicycle components 30A-B. The control signals may be communicated wirelessly using any technique, protocol, or standard. For example, Institute of Electrical and Electronics Engineers ("IEEE") 802.11 standards, IEEE 802.15.1 or BLUETOOTH® standards, ANT™ or ANT+™ standards, and/or AIREA™ standards may be used. The bicycle components 30A-B may be any bicycle component. For example, the components 30A-B may be a drive train components and/or suspension components. In an embodiment, a component 30A may be a rear derailleur and the other component 30B may be a front derailleur. Other components may also be included. For example, the system control device 150 may be in communication with, or provide control signals for, three (3) or more components, such as a front derailleur, a rear derailleur, and a front suspension system. Alternatively, the system control device 150 may only provide control signals for a single component 30A. In an embodiment, the receiver may communicate control signals wirelessly with one component 30A, and that component 30A may communicate the control signals to another component 30B.

In an embodiment, a bicycle control system 101 includes at least one manual control device 142 including a control mechanism for generating a control signal to control at least one bicycle component 30A. The system control device 150 may be a standalone device, or may be integrated with one or more components 30A-B.

Figure 10:
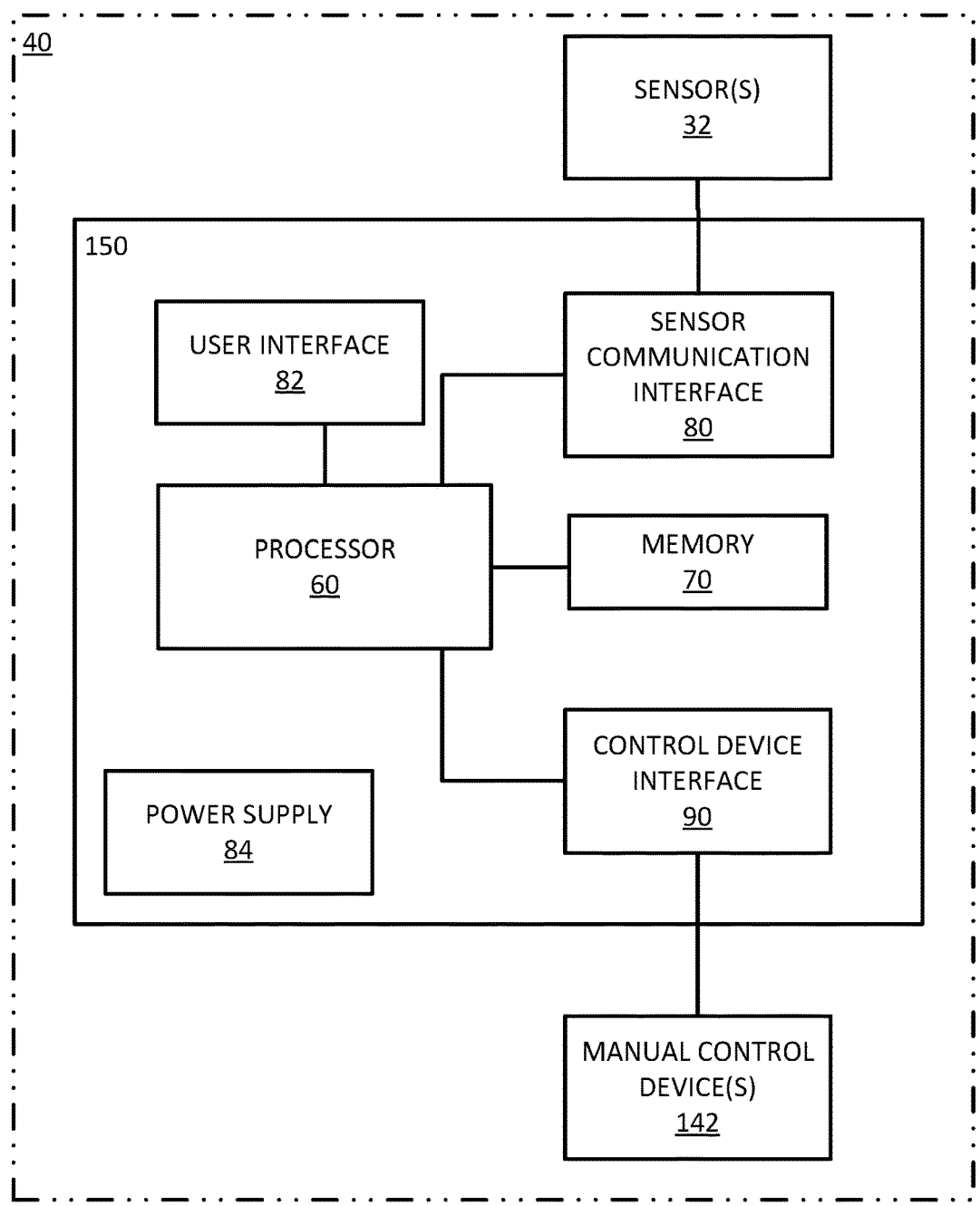
FIG. 10 is a block diagram of an exemplary control device for use in implementing methods of controlling a bicycle.

FIG. 10 is a block diagram of an exemplary control system 40 for a bicycle that may be used to implement a system control device 150. The control system 40 may be used alone to communicate with and control bicycle components, or the control system 40 may be used in conjunction with at least one other control system for components of the bicycle, such as a primary control system that may include alternative control devices such as brake lever housing integrated shift controllers. The system 40 includes a system control device 150, one or more control devices 142, and/or one or more sensors 32. The system control device 150 includes a processor 60, a memory 70, sensor communication interface 80, a power supply 84, and a control device interface 90. Optionally, the system control device 150 may also include a user interface 82. Additional, different, or fewer components are possible for the system control device 150.

The processor 60 may include a general processor, digital signal processor, an application specific integrated circuit (ASIC), field programmable gate array (FPGA), analog circuit, digital circuit, combinations thereof, or other now known or later developed processor. The processor 60 may be a single device or combinations of devices, such as through shared or parallel processing. In one embodiment, for example, the CPU 48 used may be an Atmel® ATmega324PA microcontroller with an internal eeprom memory and the transmitter and receiver 54 used may be an Atmel® AT86RF231 2.4 GHz transceiver utilizing AES encryption and DSS spread spectrum technology supporting 16 channels and the IEEE 802.15.4 communication protocol.

The memory 70 may be a volatile memory or a non-volatile memory. The memory 70 may include one or more of a read only memory (ROM), random access memory (RAM), a flash memory, an electronic erasable program read only memory (EEPROM), or other type of memory. The memory 70 may be removable from the system control device 150, such as a secure digital (SD) memory card. In a particular non-limiting, exemplary embodiment, a computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

The memory 70 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The power supply 84 is a portable power supply, which may be stored internal to the system control device 150, or stored external to the system control device 150 and communicated to the system control device 150 through a power conductive cable. The power supply may involve the generation of electric power, for example using a mechanical power generator, a fuel cell device, photo-voltaic cells, or other power generating devices. The power supply may include a battery such as a device consisting of two or more electrochemical cells that convert stored chemical energy into electrical energy. The power supply 84 may include a combination of multiple batteries or other power providing devices. Specially fitted or configured battery types, or standard battery types such as CR 2012, CR 2016, and/or CR 2032 may be used.

The control device interface 90 provides for data communication from the control devices 142 to the system control device 150. The control device interface 90 includes wired conductive signal and/or data communication circuitry operable to interpret signals provided by different control devices 142. For example, the control device interface 90 may include a series of ports for receiving control device input cables. Each of the ports may be distinguishable by the processor 60 through grouping tables or arrays, or through physical circuits or other circuitry that provide for grouping control device inputs. Alternatively, the different control devices 142 may communicate with system control device 150 wirelessly as is described herein.

The user interface 82 may be one or more buttons, keypad, keyboard, mouse, stylus pen, trackball, rocker switch, touch pad, voice recognition circuit, or other device or component for communicating data between a user and the system control device 150. The user interface 82 may be a touch screen, which may be capacitive or resistive. The user interface 82 may include a liquid crystal display ("LCD") panel, light emitting diode (LED), LED screen, thin film transistor screen, or another type of display. The user interface 82 may also include audio capabilities, or speakers. In an embodiment, the user interface is configured to provide a notice to a user that the system control device 150 has entered automatic mode, paused automatic mode, exited automatic mode, and/or modified a parameter of automatic mode. The notice may be audible, visual, and/or haptic. For example, an audible beep may be used. In an embodiment, an LCD panel is configured to display a visual notice.

In an embodiment, the user interface 82 includes multiple buttons and an LED indicator. The multiple buttons are used to communicate commands to the system control device 150, and the LED indicator lights to indicate input of the commands.

The sensor communication interface 80 is configured to communicate data such as sensor values with at least one sensor 32. The sensor communication interface 80 communicates the data using any operable connection. An operable connection may be one in which signals, physical communications, and/or logical communications may be sent and/or received. An operable connection may include a physical interface, an electrical interface, and/or a data interface. The sensor communication interface 80 provides for wireless communications in any now known or later developed format.

Wireless communication between components is described herein. Although the present specification describes components and functions that may be implemented in particular wireless communication embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

In an embodiment, components of the bicycle described herein will communicate with each other. In the case of wireless communication, the components will initially be paired so as to allow secure communication between components on the bicycle without interference from devices not associated with the system. Next one or more of the components may be paired with a separate device like a computer, tablet or phone. This paired device may provide the user interface to allow the user to communicate with the components on the bicycle, for example the system control device 150. Examples of communication are updating firmware, setting variables, and running diagnostic tools and analysis.

In accordance with various embodiments of the present disclosure, the methods described herein may be implemented with software programs executable by a computer system, such as the system control device 150. Further, in an exemplary, non-limited embodiment, implementations can include distributed processing, component/object distributed processing, and parallel processing. Alternatively, virtual computer system processing can be constructed to implement one or more of the methods or functionality as described herein.

The methods and techniques described herein may be implemented using hardware configurations described herein and one or more computer programs providing instructions for the hardware. A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant ("PDA"), a mobile audio player, a Global Positioning System ("GPS") receiver, or a system control device 150 to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a system control device 150 is integrated with a mobile telephone, PDA, a mobile audio player, a GPS receiver, and communicates wirelessly with bicycle components to provide automatic mode control.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A system control device for a bicycle having a transmission with a plurality of gear options, the system control device comprising:

at least one processor; and at least one memory including computer program code, the at least one memory and the computer program code configured to, with the at least one processor, cause the apparatus at least to perform:

determining when at least one automatic mode entry condition is met;

establishing at least one automatic mode parameter as a speed parameter when the at least one automatic mode entry condition is met;

comparing an active speed of the bicycle to the at least one speed parameter;

adjusting, based on the comparison, a shifting device of the bicycle to change to a different gear of the plurality of gears;

determining if at least one automatic mode modification condition is met; and modifying at least one automatic mode parameter based on the determination that at least one automatic mode modification condition is met.

2. The device of claim 1, wherein the demining if at least one automatic mode modification is met comprises determining if a speed of the bicycle is below a low speed threshold, and the modifying at least one automatic mode parameter comprises disabling automatic mode when the speed is below the low speed threshold.

3. The device of claim 1, wherein the at least one automatic mode entry condition comprises at least two automatic entry mode conditions.

4. The device of claim 1, wherein establishing at least one automatic mode parameter comprises establishing the speed parameter during bicycle operation using one of at least two different techniques.

5. The device of claim 1, wherein establishing at least one automatic mode parameter comprises establishing a speed range including an upper speed limit and a lower speed limit.

6. The device of claim 5, wherein a different speed range is established for at least two gear options of the plurality of gear options.

7. The device of claim 1, wherein the modifying at least one automatic mode parameter comprises pausing the automatic shifting mode.

8. The device of claim 7, wherein the modifying at least one automatic mode parameter comprises resuming automatic shifting mode.

9. The device of claim 8, wherein the resuming automatic shifting mode is performed based on a determination that a bicycle speed is above a speed threshold.

10. The device of claim 8, wherein the resuming automatic shifting mode is performed based on a determination that a speed is above a speed threshold.

11. The device of claim 8, wherein the resuming automatic shifting mode is performed based on a determination that a measured bicycle power has dropped below a power threshold.

12. The device of claim 7, wherein the pausing the automatic shifting mode is based on a determination that a button has been actuated.

13. The device of claim 12, wherein the button is configured to cause an adjustment of the shifting device to change to different gears when the automatic mode is inactive.

14. A non-transitory computer readable medium including instructions that when executed on a computer are operable to:

determine when at least one automatic mode entry condition is met;

establish at least one automatic mode parameter as a speed parameter;

compare an active speed of the bicycle to the at least one speed parameter;

adjust, based on the comparison, a shifting device of the bicycle to change to a different gear of the plurality of gears;

determine if at least one automatic mode modification condition is met; and modify at least one automatic mode parameter based on the determination that at least one automatic mode modification condition is met.

15. A method of operating a bicycle, the method comprising:

determining, by a processor, when at least one automatic mode entry condition is met;

establishing, by the processor, at least one automatic mode parameter as a speed parameter;

comparing, by the processor, an active speed of the bicycle to the at least one speed parameter;

adjusting, by the processor based on the comparison, a shifting device of the bicycle to change to a different gear of the plurality of gears;

determining, by the processor, if at least one automatic mode modification condition is met; and modifying, by the processor, at least one automatic mode parameter based on the determination that at least one automatic mode modification condition is met.

* * * * *